(12) United States Patent
Chida et al.

(10) Patent No.: US 8,488,060 B2
(45) Date of Patent: Jul. 16, 2013

(54) IMAGE SIGNAL PROCESSING APPARATUS FOR CONVERTING AN INTERLACE SIGNAL TO A PROGRESSIVE SIGNAL

(75) Inventors: Kazunori Chida, Gunma-ken (JP); Mitoku Kamei, Ota (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1422 days.

(21) Appl. No.: 11/687,736

(22) Filed: Mar. 19, 2007

(65) Prior Publication Data
US 2007/0229705 A1    Oct. 4, 2007

(30) Foreign Application Priority Data

| Mar. 29, 2006 | (JP) | 2006-091905 |
| Mar. 29, 2006 | (JP) | 2006-091906 |
| Mar. 29, 2006 | (JP) | 2006-091907 |

(51) Int. Cl.
*H04N 7/01* (2006.01)

(52) U.S. Cl.
USPC .................................. 348/448; 348/458

(58) Field of Classification Search
USPC ........... 348/581, 553, 554, 805, 806, 625, 348/790, 797, 441–459
IPC ............................ H04N 7/01,11/20
See application file for complete search history.

(56) References Cited

U.S. PATENT DOCUMENTS

| 5,633,687 A * | 5/1997 | Bhayani et al. .............. 348/441 |
| 5,864,369 A * | 1/1999 | Swan .......................... 348/448 |
| 6,380,979 B1 * | 4/2002 | Tokoi et al. .................. 348/458 |
| 7,538,822 B2 * | 5/2009 | Lee et al. ..................... 348/606 |
| 2004/0036703 A1* | 2/2004 | Aoki et al. ................... 345/690 |
| 2004/0095508 A1* | 5/2004 | Chida .......................... 348/458 |

FOREIGN PATENT DOCUMENTS

| JP | 08-190083 A | 7/1996 |
| JP | 10-276411 A | 10/1998 |
| JP | 2001-109442 | 4/2001 |
| JP | 2005-012346 A | 1/2005 |
| JP | 2005-033566 | 2/2005 |

OTHER PUBLICATIONS

Japanese Office Action dated Apr. 20, 2011, issued in corresponding Japanese Patent Application No. 2006-091906 (2 pages).
Japanese Office Action dated Jul. 6, 2011, issued in corresponding Japanese Patent Application No. 2006-091906 (2 pages).

* cited by examiner

*Primary Examiner* — Sherrie Hsia
(74) *Attorney, Agent, or Firm* — Westerman, Hattori, Daniels & Adrian, LLP

(57) ABSTRACT

An image signal processing apparatus for converting an interlace signal which creates a frame image by alternately displaying an odd field and an even field on a single screen into a progressive signal, includes a line memory for storing the interlace signal, a writing/reading portion for writing/reading the interlace signal into/from the line memory, a signal generation portion for generating a prescribed signal, a selector for selectively outputting the interlace signal from the line memory or the prescribed signal from the signal generation portion, and a controller for controlling signal selection by the selector.

8 Claims, 13 Drawing Sheets

Image signal processing circuit

IMAGE SIGNAL PROCESSING APPARATUS FOR CONVERTING AN INTERLACE SIGNAL TO A PROGRESSIVE SIGNAL

This application claims priority under 35 U.S.C. §119 to Japanese Patent Application No. 2006-091905 filed on Mar. 29, 2006, No. 2006-091906 filed on Mar. 29, 2006, and No. 2006-091907 filed on Mar. 29, 2006, the entire disclosure of which are incorporated herein by reference in their entireties.

BACKGROUND OF THE INVENTION

1. Field of the Invention

The present invention relates, inter alia, to an image signal processing apparatus for converting an interlace type image signal for displaying an image on a screen of, e.g., a cathode-ray tube into a progressive type image signal for displaying an image on a screen oft e.g., an LCD-TV or a plasma TV.

2. Description of the Related Art

The following description sets forth the inventor's knowledge of related art and problems therein and should not be construed as an admission of knowledge in the prior art.

In an interlace scanning system, in order to display a single frame image on a screen of e.g., a TV or a display, initially, scanning is performed from the uppermost portion of the screen toward the lowermost portion thereof along odd-numbered scanning lines. Then, returning to the uppermost portion of the screen, scanning is again performed from the uppermost portion toward the lowermost portion thereof along even-numbered scanning lines. Thus, scanning is performed twice for a single frame image. On the other hand, in a progressive scanning system, scanning is completed by a single scanning from the uppermost portion of the screen toward the lowermost portion thereof. In order to display an interlace image, which is a TV image designed for cathode-ray tubes, on a screen of, e.g., an LCD-TV or a plasma TV, interlace-Progressive conversion (hereinafter simply referred to as "IP conversion") technique for converting an interlace type image signal into a progressive image type signal is required.

Conventionally, for example, such IP conversion has been performed as follows. That is, in the case of an interlace type image signal, in the odd field, since the image signal is inputted only to the odd scanning line, an image signal on either one of the upper and lower scanning lines adjacent to the odd scanning line is inputted into the empty even scanning line. In the same manner, in the even field, since the image signal is inputted only into the even scanning line, an image signal on either one of the upper and lower scanning lines adjacent to the even scanning line is inputted into the empty odd scanning line. Thus, a progressive signal is created.

That is, by simply doubling the scale of the interlace image signal in the vertical direction, it becomes possible to convert the interlace image signal into a progressive image signal. In an interlace image signal, since either the odd scanning lines or even scanning lines are empty, vertically doubling the scale does not cause an increased screen size since either the empty odd scanning lines or the empty even scanning lines are used.

Now, one of scaling methods as a related art will be explained based on a concrete image signal processing circuit having three line memories with reference to FIG. 13. This circuit shown in FIG. 13 includes three line memories 10a, 10b and 10c in the image signal processing circuit. An input data (digital image signal) will be inputted into one of the line memories 10a, 10b and 10c. In this figure, the input data is shown by a single line though it is multiple-bit data. To the line memories 10a, 10b and 10c, a write enable signal is supplied from the memory write control circuit 11. The input data is written in one of the write enabled line memories 10a, 10b and 10c.

To the memory write control circuit 11, a horizontal synchronizing signal HS1 on the input data, a horizontal data clock signal CK1, and a VSTART signal VATART1 showing the initiation of one frame are supplied. Based on these signals, the memory write control circuit 11 controls the writing of the input data to the line memories 10a, 10b and 10c.

A memory read/line select control circuit 12 is connected to the line memories 10a, 10b and 10c to control selection of the line memories 10a, 10b and 10c and reading of the selected line memory 10a, 10b or 10c. To the memory read/line select control circuit 12, a horizontal synchronizing signal HS2 on the input data, a horizontal data clock signal CK2, and a scaling ratio set value signal showing the enlarging/reducing ratio are supplied. Also to the memory read/line select control circuit 12, a VSTART signal VSTART2 showing the initiation of reading by the memory read/line select control circuit 12 is supplied from the memory write control circuit 11. The image data read out of the line memories 10a, 10b and 10c will be supplied to the interpolation operation portion 18 via multiplexers MUX 16a and 16b. The interpolation operation portion 18 outputs an image signal required by an output side image signal in accordance with the coefficient of the coefficient generation portion 15.

By using three line memories 10a, 10b and 10c, double scaling in the vertical direction can be performed by outputting one horizontal line data from the line memory and then outputting the same data again. At the time of outputting the same horizontal data, output failure of input data would not cause since the input data is stored using two different line memories. In order to vertically scale, a plurality of line memories will be required since a line memory for outputting data and a line memory for inputting data cannot be shared. As explained above, by double-scaling an interlace image signal, which has half image data as compared with that of a progressive image signal, a progressive image signal can be created (see, e.g. JP 2005-033566, A, JP 2001-109442, A).

In the case of creating a progressive type image signal from an interlace type image signal, in some cases, image processing is performed using two image signals, i.e., a past image signal delayed by one field and a current image signal of a current field. In this case, if the image is in static condition, even if a single image signal is created by simply combining the current and past image signals, there will be no problem. In the case of a moving image, however, in many cases, IP conversion using a motion discrimination circuit is performed in consideration of the motion between the two image signals. If two fields are simply superimposed, in a motion scene, some problems will arise. For example, the image may include horizontal stripes, which is called interlace corn, the image may be recognized as jaggy, and/or the image may deteriorate in sharpness. In order to suppress the aforementioned problems, if complicated detection processing is employed, the entire system will be required to be high in performance. For example, memories will be required every frame. This results in increased cost. On the other hand, in the case of using a cost-effective two-dimensional digital filter, the cost can be kept in relatively low. However, because of the interpolation operation performed in the two-dimensional field, the interpolated image deteriorates in sharpness.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an image processing apparatus capable of converting an interlace type image signal into a progressive type image signal without deteriorating image sharpness, and/or capable of providing an image less invisible in motion blurring even in the case of an LCD panel not fast in operation property, and/or capable of simplifying circuit structure by decreasing the number of line memories required to convert an interlace type image signal into a progressive type image signal, and/or capable of attaining a picture level suitable for a screen at the time of converting an interlace type image signal into a progressive type image signal.

According to a first as of a preferred embodiment of the present invention, an image signal processing apparatus for converting an interlace signal which creates a frame image by alternately displaying an odd field and an even field on a single screen into a progressive signal, the apparatus comprising:

a line memory for storing the interlace signal;

a writing/reading portion for writing/reading the interlace signal into/from the line memory;

a signal generation portion for generating a prescribed signal;

a selector for selectively outputting the interlace signal from the line memory or the prescribed signal from the signal generation portion; and a controller for controlling signal selection by the selector, wherein the controller controls the selector such that, when the odd field of the interlace signal is being read from the line memory, the interlace signal is outputted from the line memory to odd lines of a progressive signal to be converted and the prescribed signal is outputted from the signal generation portion to even lines of the progressive signal, and when the even field of the interlace signal is being read from the line memory, the interlace signal is outputted from the line memory to even lines of the progressive signal and the prescribed signal is outputted from the signal generation portion to odd lines of the progressive signal.

In some examples, in the image processing apparatus, it can be configured such that the signal generation portion generates a black image signal showing black or color close to black as the prescribed signal, and the controller controls the selector such that, when the odd field or the even field of the interlace signal is being read, the black image signal is outputted from the signal generation portion to all of even lines or odd lines of the progressive signal, respectively.

In some examples, in the image processing apparatus, in place of the black image signal, a white image signal showing white or color close to white can be used as the prescribed signal. Alternatively, it can be configured such that a black image signal and a white image signal are used as the prescribed signals, and the controller controls the selector such that, when the odd field or the even field of the interlace signal is being read, the black image signal and the white image signal are alternately outputted from the signal generation portion to a single horizontal even line and a single horizontal odd line of the progressive signal.

In some examples, in the image processing apparatus, it can be configured such that a black image signal and a white image signal are used as the prescribed signals, and the controller controls the selector such that, when the odd field or the even field of the interlace signal is being read, the black image signal and the white image signal are alternately outputted from the signal generation portion to every single pixel of each single horizontal even line or every single pixel of each single horizontal odd line of the progressive signal, respectively.

In some examples, in the image processing apparatus, an intermediate color signal showing color between white and black or a color signal showing color other than white, black and an intermediate color between white and black can be used as the prescribed signals.

According to a second aspect of a preferred embodiment of the present invention, an image signal processing apparatus for converting an interlace signal which creates a frame image by alternately displaying an odd field and an even field on a single screen into a progressive signal, the apparatus comprising:

a first line memory for storing the interlace signal;

a writing/reading portion for writing/reading the interlace signal into/from the first line memory;

an input-output converter having an input-output comparative table, the converter being configured to receive the interlace signal from the first line memory, convert brightness level of the interlace signal with reference to the input-output comparative table into a converted signal and output the converted signal, a second line memory for storing the converted signal from the input-output converter;

a selector for selectively outputting the interlace signal from the first line memory or the converted signal from the second line memory; and a controller for controlling signal selection by the selector, wherein the controller controls the selector such that, when the odd field of the interlace signal is being read from the first line memory, the interlace signal is outputted from the first line memory to odd lines of a progressive signal to be converted and the converted signal is outputted from the second line memory to even lines of the progressive signal, and when the even field of the interlace signal is being read from the first line memory, the interface signal is outputted from the first line memory to even lines of the progressive signal and the converted signal is outputted from the second line memory to odd lines of the progressive signal to the selector.

In some examples, in the image processing apparatus, the apparatus can further comprises a gain adjuster disposed between the line memory and the selector, the gain adjuster being configured to increase brightness level of the interlace signal from the line memory to output the interlace signal.

According to a third aspect of a preferred embodiment of the present invention, an image signal processing apparatus for converting an interlace signal which creates a frame image by alternately displaying an odd field and an even field on a single screen into a progressive signal, the apparatus comprising:

a line memory for storing the interlace signal;

a writing/reading portion for writing/reading the interlace signal into/from the line memory;

an average picture level calculator for calculating an average value of a brightness level of the interlace signal from the line memory;

a selector for selectively outputting the interlace signal from the line memory or the signal from the average picture level calculator; and a controller for controlling signal selection by the selector, wherein the controller controls the selector such that, when the odd field of the interlace signal is being read from the line memory, the interlace signal is outputted from the line memory to odd lines of a progressive signal to be converted and the signal from the average picture level calculator is outputted to even lines of the progressive signal, and when the even field of the interlace signal is being read from the line memory, the interlace signal is outputted from the line memory to even lines of the progressive signal and the signal from the average picture level calculator is outputted to odd lines of the progressive signal.

In some examples, in the image processing apparatus, it can be configured such that the average picture level calculator obtains an average value of brightness of a single horizontal line of the interlace signal. Alternatively, it can be configured such that the avenge picture level calculator obtains an average value of brightness of every several pixels of a single horizontal line of the interlace signal, the calculator being provided with a plurality of registers for holding the average values, and the controller controls the selector such that signals from the plurality of registers are outputted selectively.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
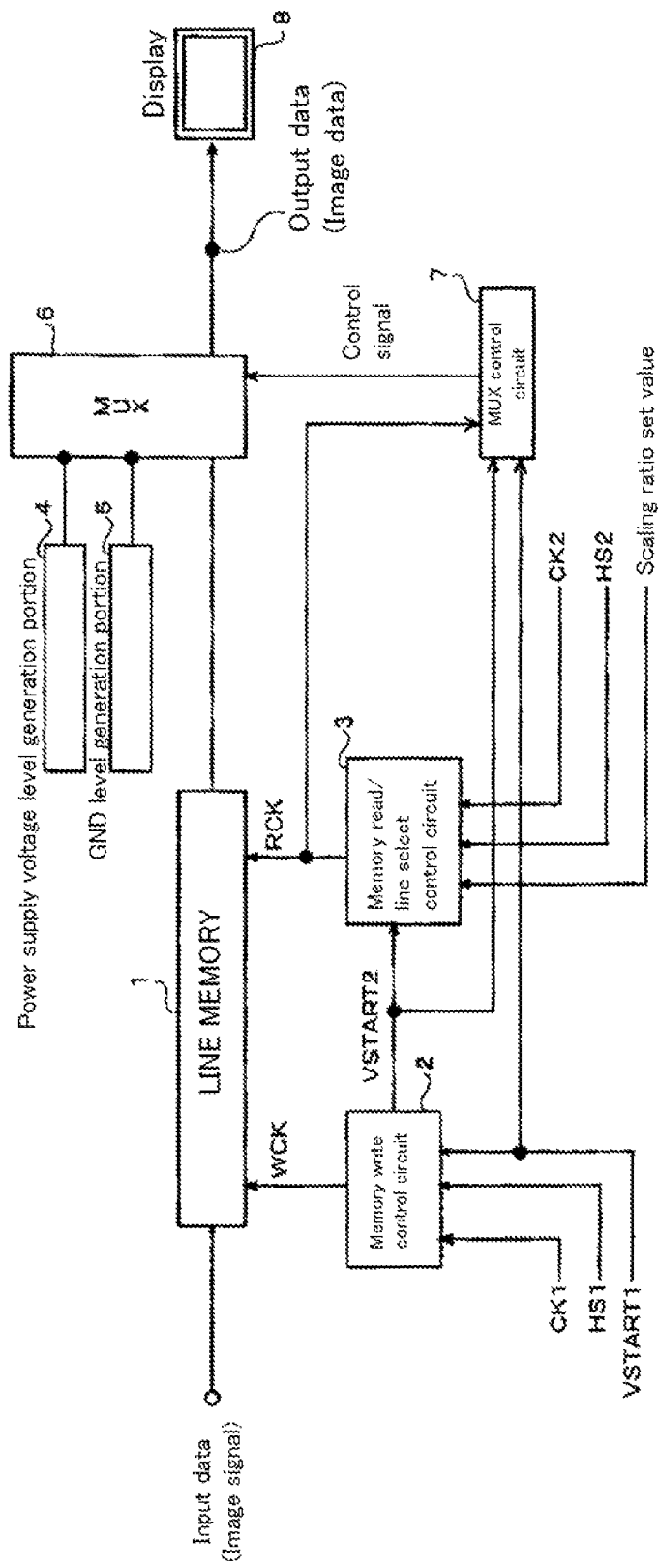
FIG. 1 is a block diagram showing an image signal processing circuit according to an embodiment of the present invention.

An embodiment of the present invention will be detailed with reference to the attached drawings. FIG. 1 is a block diagram of an image signal processing circuit according to an embodiment of the present invention. In this circuit, input image data, which is a digital image signal, is inputted into a line memory 1. A writing clock signal WCK is supplied to the line memory 1 from a memory write control circuit 2. To the memory write control circuit 2, a horizontal synchronizing signal HS1 on the input image signal data, a horizontal data clock signal CK1, and a VSTART signal VSTART1 showing the initiation of one frame are supplied. Based on these signals, the memory write control circuit 2 controls the writing of the input image signal data to the line memory 1.

A memory read/line select control circuit 3 is connected to the line memory 1 to control the reading of the data from the line memory 1. The memory read/line select control circuit 3 supplies a reading clock signal RCK to the line memory 1. To the memory read/line select control circuit 3, a horizontal synchronizing signal HS2 on the output image signal data, a horizontal data clock signal CK2, and a scaling ratio set value signal showing the enlarging/reducing ratio are supplied. Also to the memory read/line select control circuit 3, a VSTART signal VSTART2 showing the initiation of reading by the memory read/line select control circuit 3 is supplied from the memory write control circuit 2. Based on these signals, the memory read/line select control circuit 3 controls the reading of image signal data from the line memory 1.

The image signal read out of the line memory 1 will be supplied to the multiplexer (MUX) 6. Other than the image signal from the line memory 1, also supplied to this multiplexer 6 are a power supply voltage level signal from a power supply voltage level generation portion 4 and a GND level signal from a GND level generation portion 5. The multiplexer 6 selects a signal to be outputted to a display 8 from the image signal, the power supply voltage level signal and the GND level signal.

The multiplexer 6 is controlled by a multiplexer control circuit 7 to which the VSTART signal VSTART1, the VSTART signal VSTART2 and the reading clock signal RCK are supplied. The multiplexer control circuit 7 discriminates whether the current field is an odd field or an even field and also detects the line change timing. In synchronization with the reading clock signal RCK, the multiplexer control circuit 7 controls the multiplexer 6 so that the multiplexer 6 selects one of the inputted signals. The control circuit 7 outputs a required control signal to the multiplexer 6.

For example, in the case of converting an interlace type image signal into a progressive type image signal, the scaling ratio set value to be supplied to the memory read/line select control circuit 3 is set to 2. This scaling ratio set value denotes a vertical scaling ratio. In the above case, since the output data will be doubled with respect to the input data, a line having no signal will be generated every other line. Either a signal from the power source voltage level generation portion 4 or a signal from the GND level generation portion 5 is selected and supplied to the line having no image signal.

Thus, the multiplexer 6 outputs image data to the display 8 in accordance with an image signal having the number of scanning lines and the number of horizontal data requested by the display 8.

Figure 2:
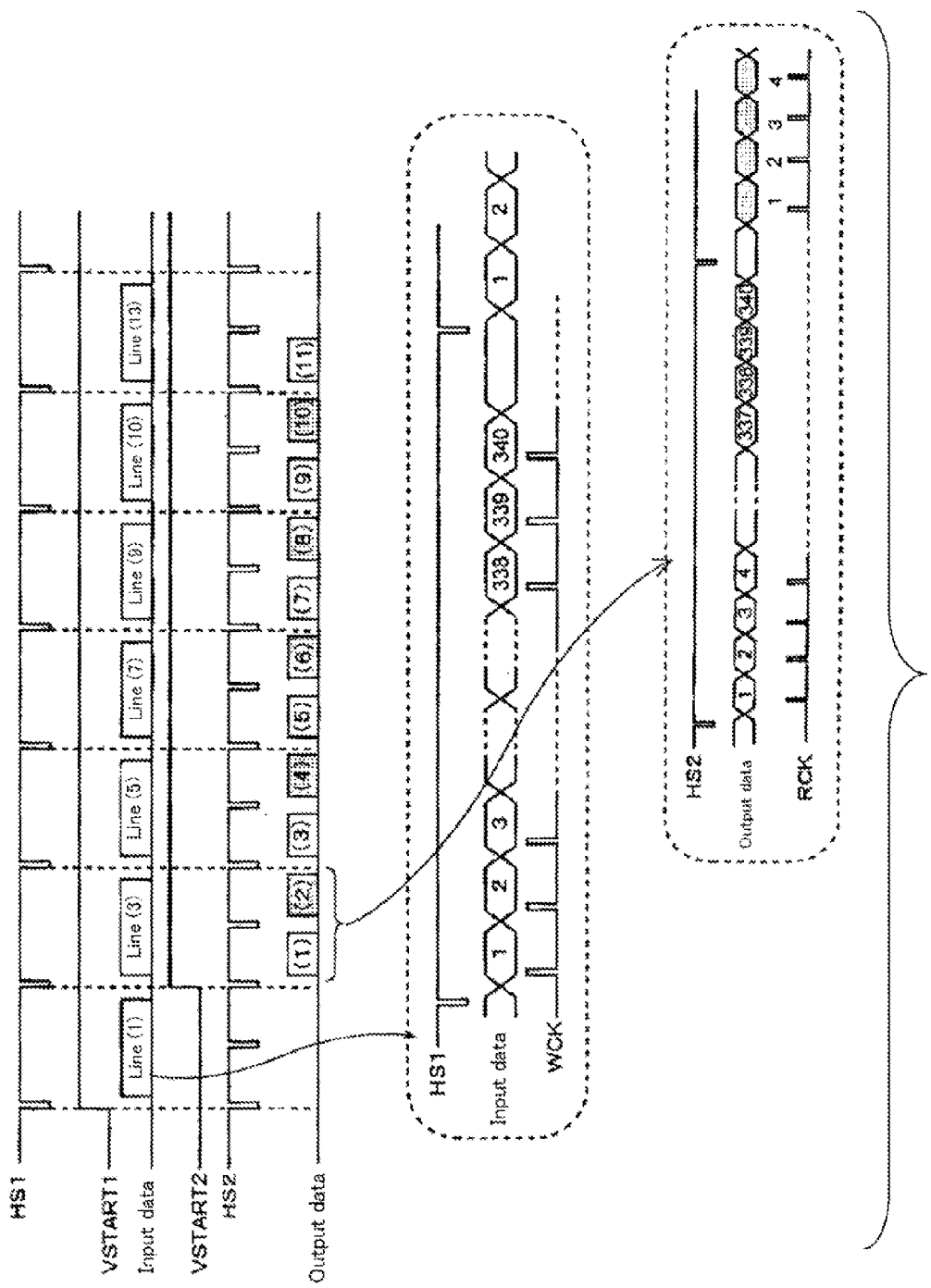
FIG. 2 is a timing chart showing the operation of the image signal processing circuit shown in FIG. 1.

Now, image signal data to be outputted from the multiplexer 6 will be explained with reference to the timing chart shown in FIG. 2. FIG. 2 shows an operation of converting an interlace type image signal into a progressive type image signal. In this processing, the number of scanning lines is doubled in the vertical direction while keeping the horizontal image data unchanged. Although the image data is doubled, it looks like non-enlarged processing since image data is superimposed on a line having no interlace image signal.

FIG. 2 shows an odd field in which image data are inputted in odd scanning lines and no image is inputted in even scanning lines. Initially, the horizontal synchronizing signal HS1 of the input image signal and the VSTART signal VSTART1 corresponding to the vertical synchronizing signal are inputted into the memory write control circuit 2. The horizontal synchronizing signal and the vertical synchronizing signal are obtained from the input image signal. When the first horizontal line of one frame of the inputted image signal starts, the signal VSTART1 becomes an "H" level, and this signal VSTART1 is maintained the "H" level until the end of the effective line of the frame. The horizontal synchronizing signal HS1 has an "L" level pulse at the head of each horizontal line. The memory write control circuit 2 supplies the writing clock signal WCK to the line memory 1 in accordance the "L" level of the horizontal synchronizing signal HS1 when the signal VSTART1 is the "H" level to write the input data (image signal) in the line memory 1. In the same manner, the following frames will also be written.

Then, the memory write control circuit 2 changes the signal START2 to an "H" level upon completion of the writing to one line. This is a signal showing the initiation of reading. The memory read/line select control circuit 3 initiates the reading operation depending on the "L" level of the horizontal synchronizing signal HS2 while the signal VSTART2 is in the "H" level, and makes the line memory 1 readenable. At that time, the reading from the line memory 1 is performed. This reading is performed based on the reading clock signal RCK having a clock frequency two times faster than the writing clock signal WCK. During the ½ horizontal duration of the "H" level of the horizontal synchronizing signal HS1, i.e., during one horizontal duration of the "H" level of the horizontal synchronizing signal HS2, image signal data of one line is read out. This will be repeated twice. Within the same horizontal time period of the horizontal synchronizing signal HS1, image signal data for two lines is outputted.

Thereafter, the output of the line memory 1 will be supplied to the multiplexer 6. The multiplexer 6 performs selection of the image data signal, the power source voltage level signal, or the GND level value signal. For example, during the first horizontal level time period of the horizontal synchronizing signal HS2, the image signal data is outputted from the line memory 1 as first line image data (shown as (1) in FIG. 2). Then, during the second horizontal level time period of the horizontal synchronizing signal HS2, the GND level signal is outputted from the line memory 1 as second line image data (shown as (2) in FIG. 2). As a result, during one horizontal level time period of the horizontal synchronizing signal HS1, the image signal data (1) and (2) of two lines synchronized with the horizontal synchronizing signals HS1 is outputted.

After completion of two horizontal level time periods of the horizontal synchronizing signal HS2, in the same manner, the memory read/line select control circuit 3 selects the third line image data in the line memory 1 and outputs the image signal data. Then, the memory read/line select control circuit 3 selects the GND level and outputs it as image data signal, Thus, interlace-progressive conversion processing in which the number of scanning lines of one screen is doubled in the vertical direction can be performed.

Figure 3:
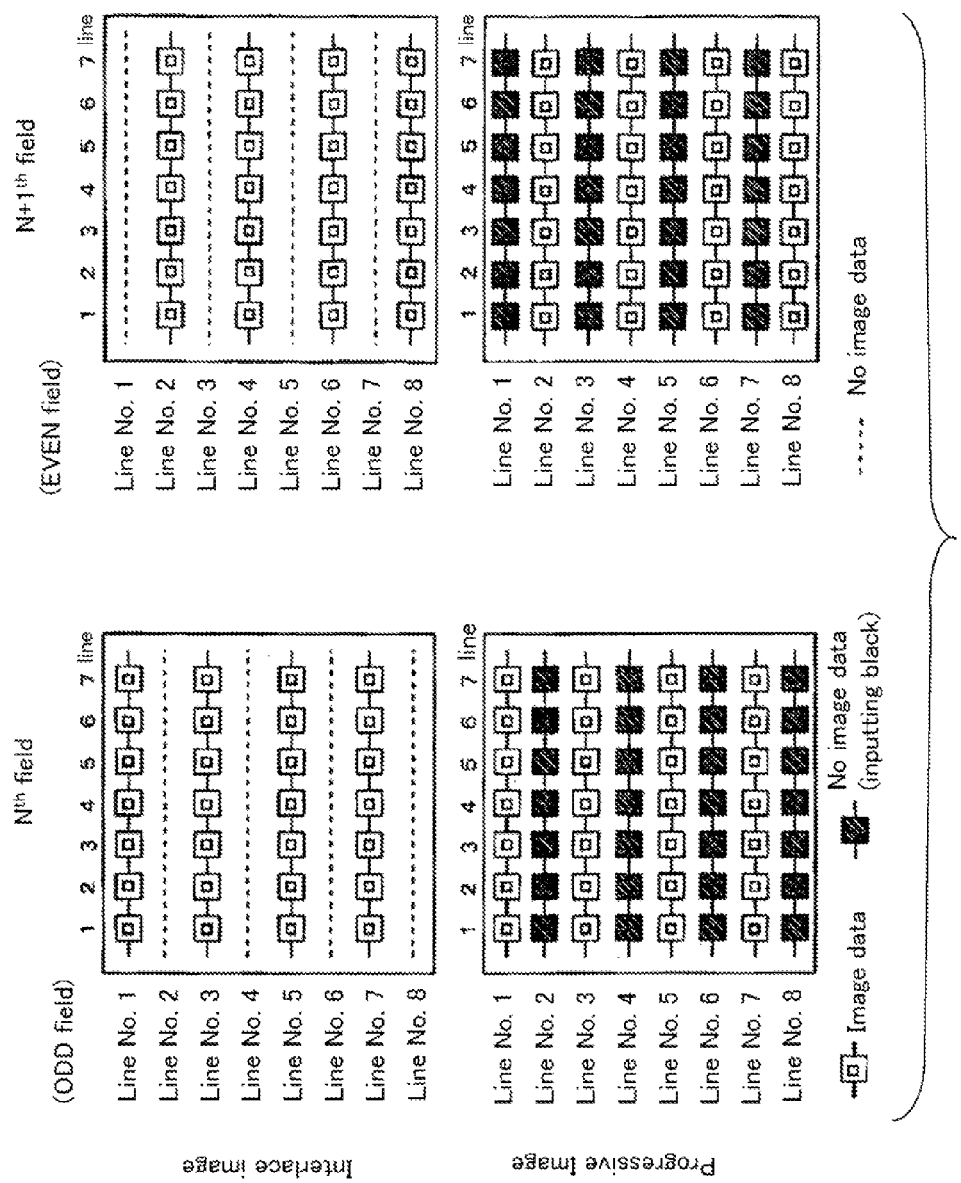
FIGS. 3 to 5 show various images created by image signal processing circuits according to embodiments of the present invention.

The status of the screen converted from an interlace type image signal into a progressive type image signal is shown in FIG. 3. In the interlace type image signal shown in FIG. 3, when the $N^{th}$ field is an odd field, only odd lines have image data. When the $N+1^{th}$ field is an even field, and only even fields have image data. Contrary to a conventional interlace-progressive conversion in which one progressive type image is created by superimposing images of continuous two fields, i.e., an odd field and an even field, in this embodiment, one progressive image is created as follows.

That is, in the $N^{th}$ odd field, as shown in the left lower figure of FIG. 3, image data signal is inputted only into the odd lines, and black image data signal which is a GND level value signal is inputted into the even lines. Contrary to the above, in the $(N+1)^{th}$ even field, as shown in the right lower figure of FIG. 3, image data signal is inputted only into the even lines, and black image data signal which is a GND level value signal is inputted into the odd lines. In this case, contrary to a conventional IP conversion, no filtering processing, etc., is performed, causing no deterioration of the sharpness of the created progressive image. Even in the case of a moving image quick in motion, since the line signal having image data changes not by a field cycle but by a frame cycle, an image less invisible in motion blurring can be obtained even in the case of an LCD panel not fast in moving image property.

Figure 4:
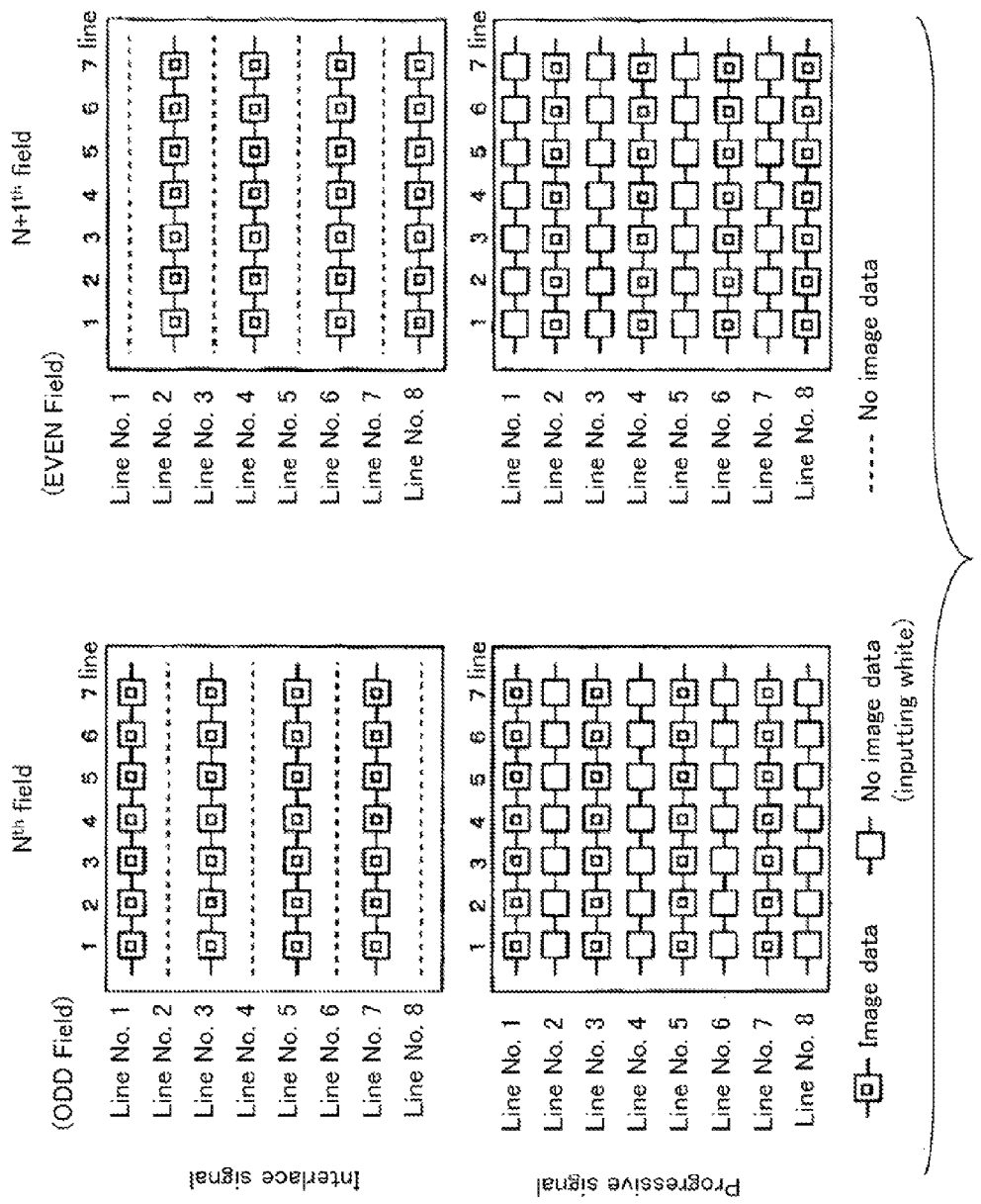

Although a black image data signal is inputted into the blank lines in the above embodiment shown in FIG. 3, in place of the black image data signal, a white image data signal which is a power voltage level value signal can be inputted as shown in FIG. 4. For example, in a bright circumference in the daytime, it is sometimes preferable to make the image on the display 8 brighter by inputting a white image data signal into the blank lines in place of inputting a black image data signal.

If black image data signal is inputted into all of the blank lines, the image displayed on the display 8 will look rather dark as compared to the original interlace image signal, which is appropriate to movie pictures. Depending on circumstances, however, it becomes a hard-to-see image. In such a case, as shown in FIG. 5, a white image signal and a black image signal can be alternately inputted into every pixel in each lank line.

Figure 5:
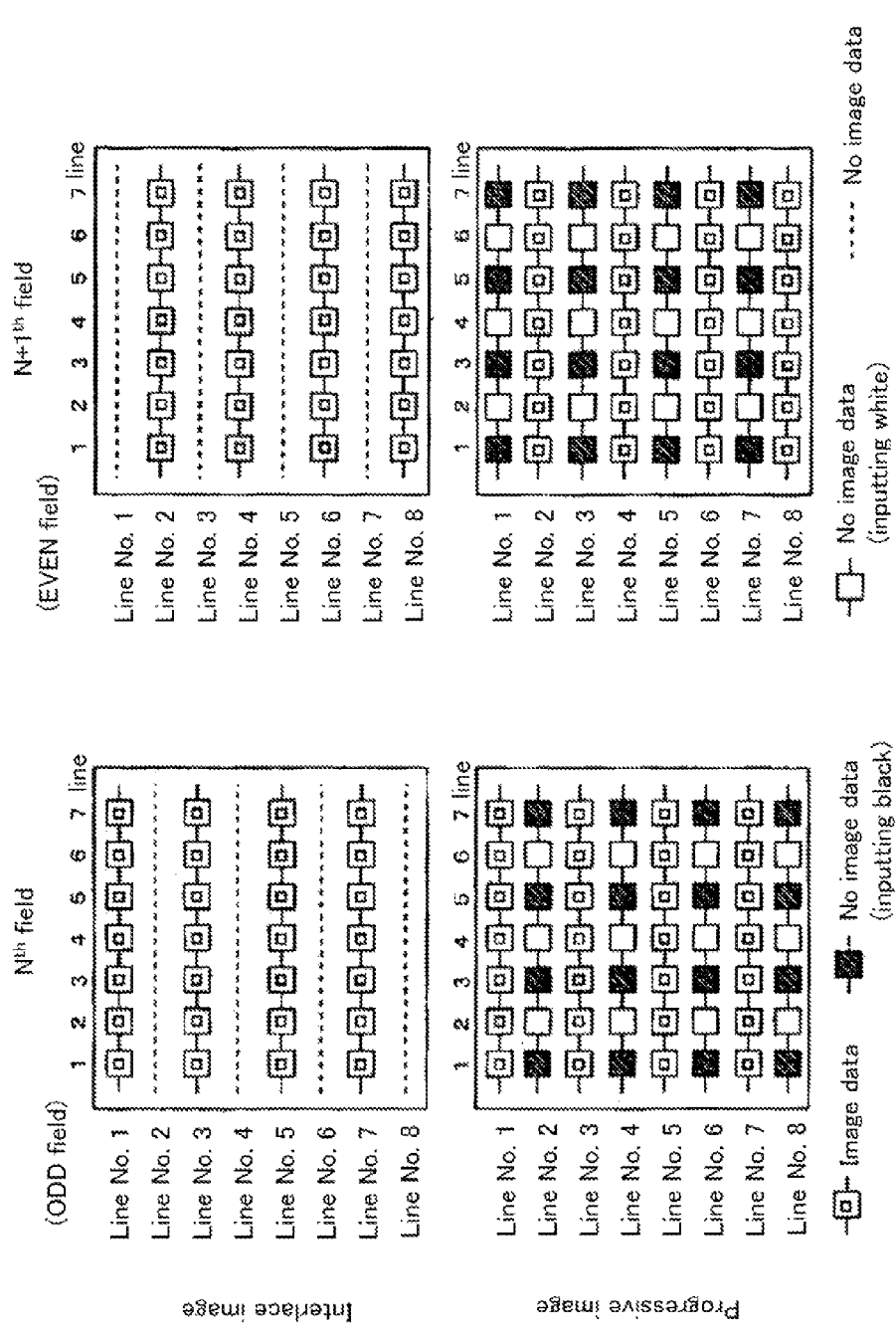

In place of the illustrated embodiment shown in FIG. 5 in which white image and black image are alternately arranged every pixel in each blank line, a black image data signal and a white image data signal can be alternately inputted every horizontal blank line (not illustrated). In this case, the same effect as in the illustrated embodiment can be obtained.

Figure 6:
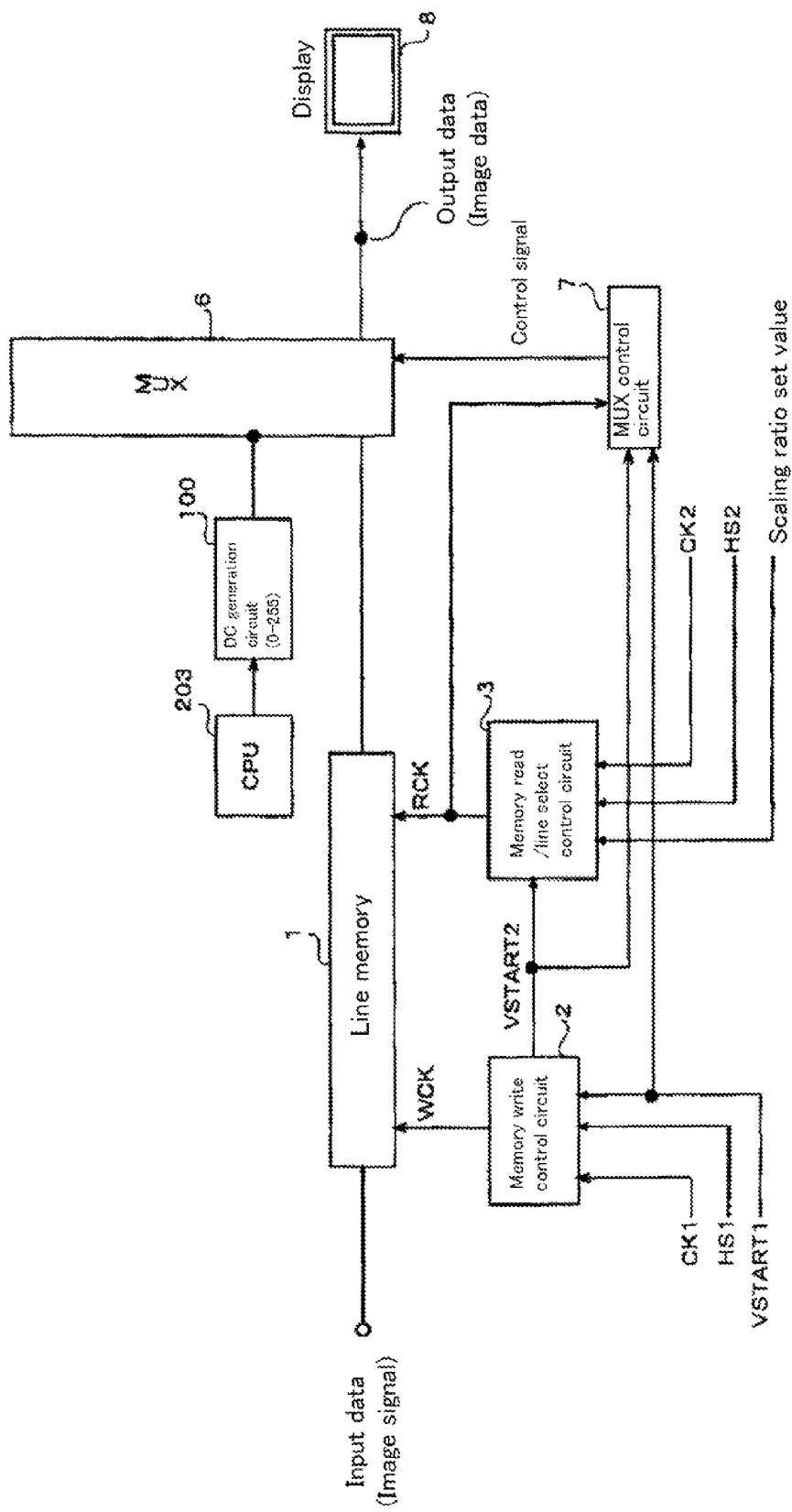
FIGS. 6 to 12 show various image signal processing circuits according to another embodiments of the present invention.

Furthermore, in place of the above embodiments in which black image data and white image data are used, gray color image data as intermediate color image data between black image data and while image data can be used. In the case of using gray color image data, the same or similar effects as in the case where black image data and white image data are alternately used can be obtained. In order to realize such an intermediate color image data between black image data and white image data, a DC generation circuit 100 shown in FIG. 6 is required. The DC generation circuit 100 is configured to output an image signal of any level in accordance with the command from the CPU 203. In the embodiment shown in FIG. 6, an image signal of any level set by the command from the CPU 203 is outputted from the DC generation circuit 100, an intermediate color image data between black image data and white image data is inputted into blank lines.

Although not illustrated in this document, the average brightness of the display 8 can be adjusted by inputting color components other than gray which is an intermediate color of black and white, such as, e.g., brown, dark blue or dark green.

Figure 7:
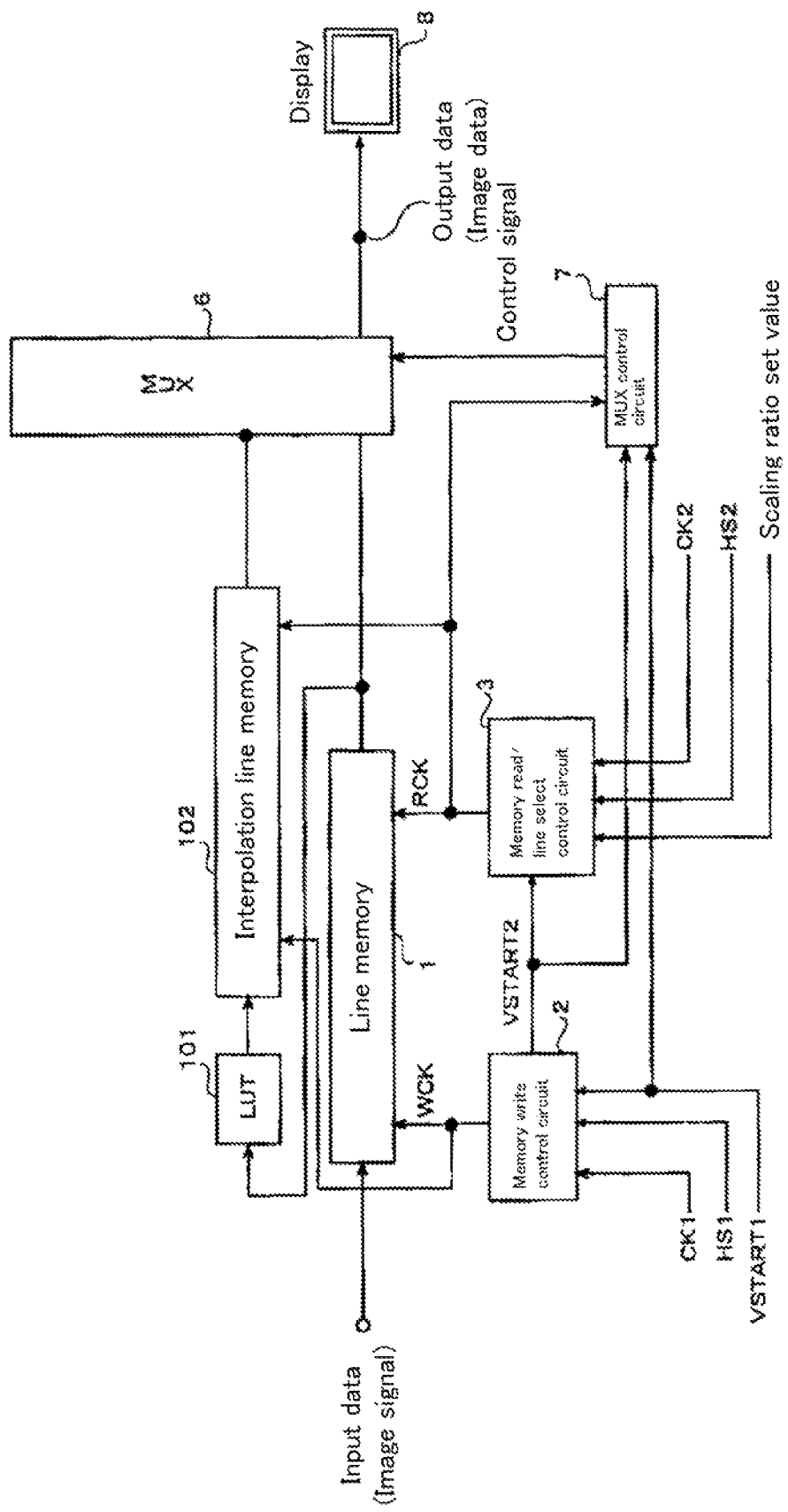

Furthermore, as illustrated in FIG. 7, a color image data signal to be inputted into the blank line can be decided by using a look-up table LUT101. The look-up table LUT 101 is a table for an input-output comparison table to be used to correct digitalized brightness gradation data into any given gradation. The input color is decided based on the inputted interlace image signal. In the embodiment shown in FIG. 1, the same color image signal is inputted into all of the blank lines. In cases where there is a big difference in brightness, darkness and/or color in the same line, inputting the same color image signal in the same entire line may sometimes spoil the original image.

To cope with this problem, in the embodiment shown in FIG. 7, the most appropriate color is decided based on the original image data. That is, using the look-up table LUT101, each color to be inputted in each pixel is decided. The decided color is stored in the interpolation line memory 102. In order to decide the color to be inputted in a blank line, the interpolation line memory 102 for holding color information for one line depending on a display to be outputted is required. A single horizontal line of image data to be inputted in the blank line is prepared in the interpolation line memory 102 every single horizontal line of the interlace image signal, and image data different in color every single pixel will be outputted. In this case, it is possible to suppress a feeling of strangeness as compared with the case in which the same image data is inputted in the entire blank line.

Figure 8:
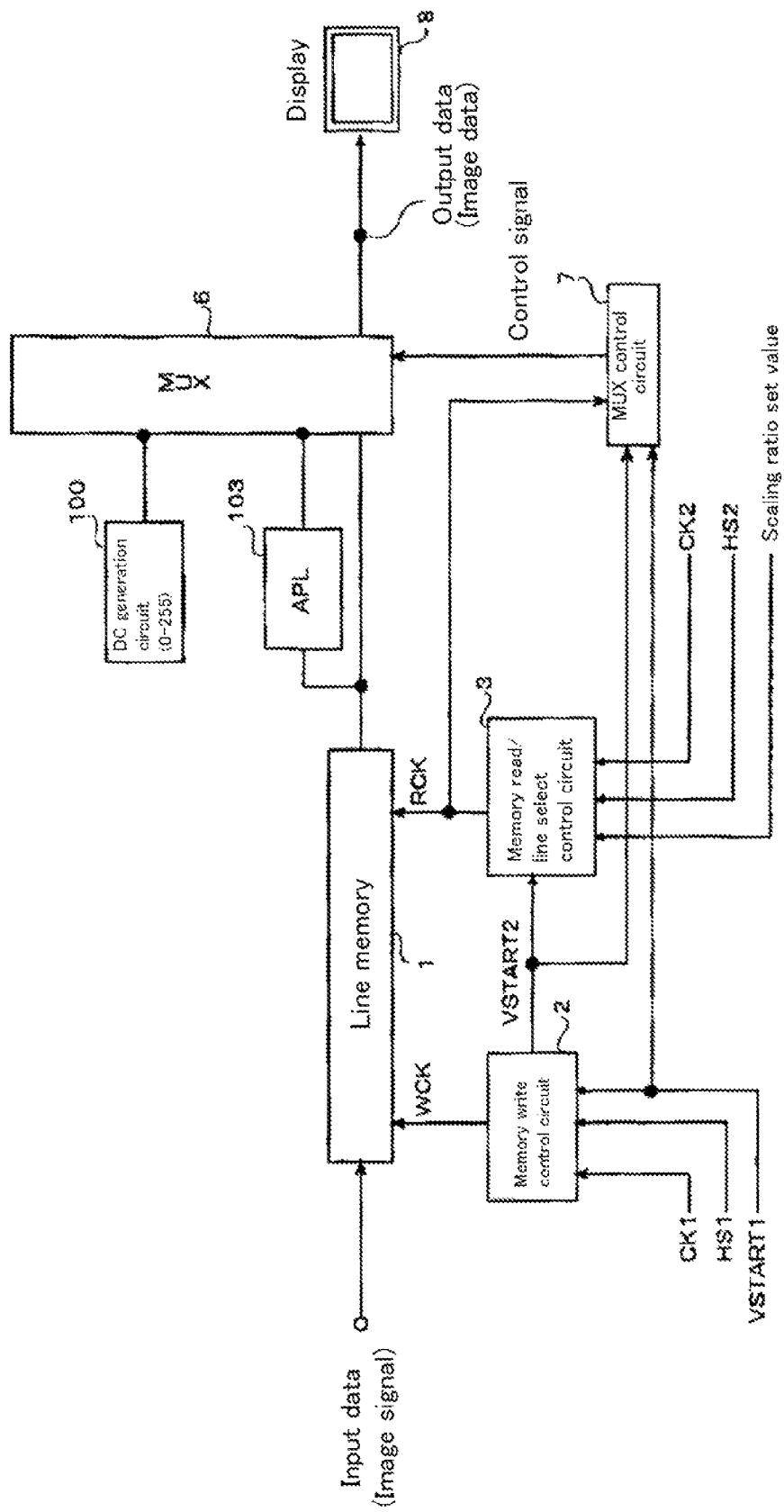
Figure 9:
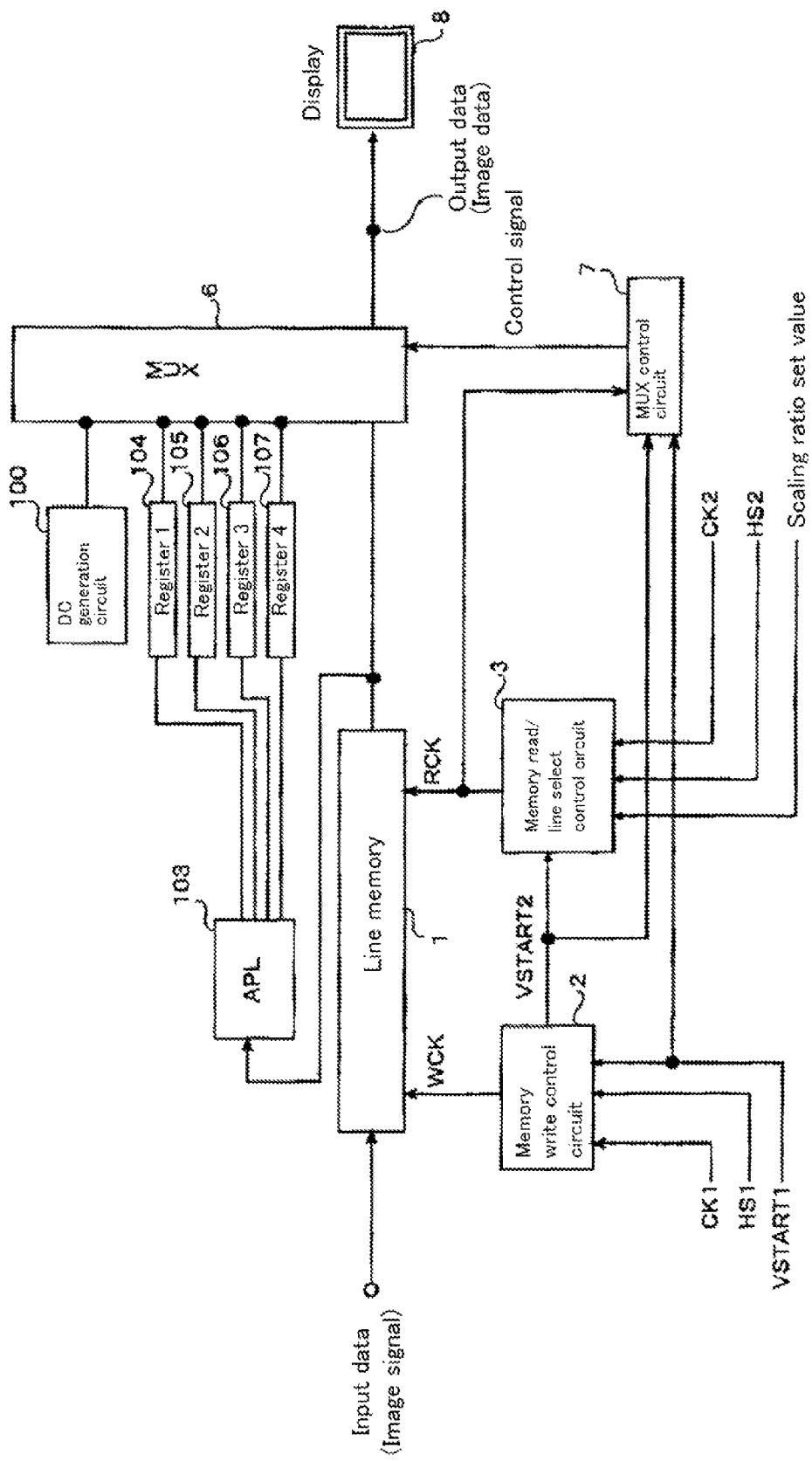

Alternatively, as illustrated in FIG. 8, an APL (average picture level) circuit 103 can be used to decide the color to be inputted into the blank line. The APL circuit 103 calculates an average color level of image data in a single horizontal line. The APL circuit 103 obtains an average level by adding all pixels to be outputted, and therefore no large size memory is required, resulting in a compact circuit. Depending on the value outputted from the APL circuit 103, the signal level from the DC generation circuit 100 is decided and a signal having the decided signal level is inputted into the blank line. In this embodiment, since an average color level is obtained every single horizontal line, it is possible to decide an appropriate color every single horizontal line. In place of the above-mentioned embodiment in which the average picture level of the entire single horizontal line is obtained, an average picture level can be obtained, for example, every ten pixels, every twenty pixels, or every thirty pixels, to decide the color to be inputted. For example, in the embodiment shown in FIG. 9, a single horizontal line is divided into four, and respective four average picture levels obtained by the APL circuit 103 are stored in a register 104, a register 105, a register 106, and a register 107, respectively. Based on the average picture levels stored in the registers 104, 105, 106 and 107, the color to be inputted is decided.

In the above-embodiments, a color to be inserted into the blank line is decided at the time of the IP conversion. In place of this, the brightness level of an image signal can be adjusted. Fr example, in the case of increasing the brightness level, the Y component (brightness level) of YCbCr format data is adjusted. The YCbCr format is used in color separation, and a DCT transform (Discrete Cosine Transform) can effectively reduce data. YCbCr format is used in JPEG commonly used in digital cameras or in MPEG used in image software of DVDs. In YCbCr, Y denotes a brightness composition of a color, Cb denotes a blue color difference. Cr denotes a red color difference, which represent a color chroma component, respectively. All colors capable of being represented in a RGB color space can be represented by the YCbCr format. The conversion equations from a RGB format into a YCbCr format and vice versa are as follows:

$$Y=0.29900*R+0.58700*G+0.11400*B$$

$$Cb=-0.16874*R-0.33126*G+0.50000*B+0x80$$

$$Cr=0.5000*R-0.41869*G-0.08131*B+0x80 \quad \text{Formula (1)}$$

$$R=Y+1.40200*(Cr-0x80)$$

$$G=Y-0.34414*(Cb-0x80)-0.71414*(Cr-0x80)$$

$$B=Y+1.77200*(Cb-0x80) \quad \text{Formula (2)}$$

$$0 \leq R \leq 0xFF, 0 \leq Y \leq 0xFF$$

$$0 \leq R \leq 0xFF, 0 \leq Y \leq 0xFF$$

$$0 \leq R \leq 0xFF, 0 \leq Y \leq 0xFF \quad \text{Formula (3)}$$

Figure 10:
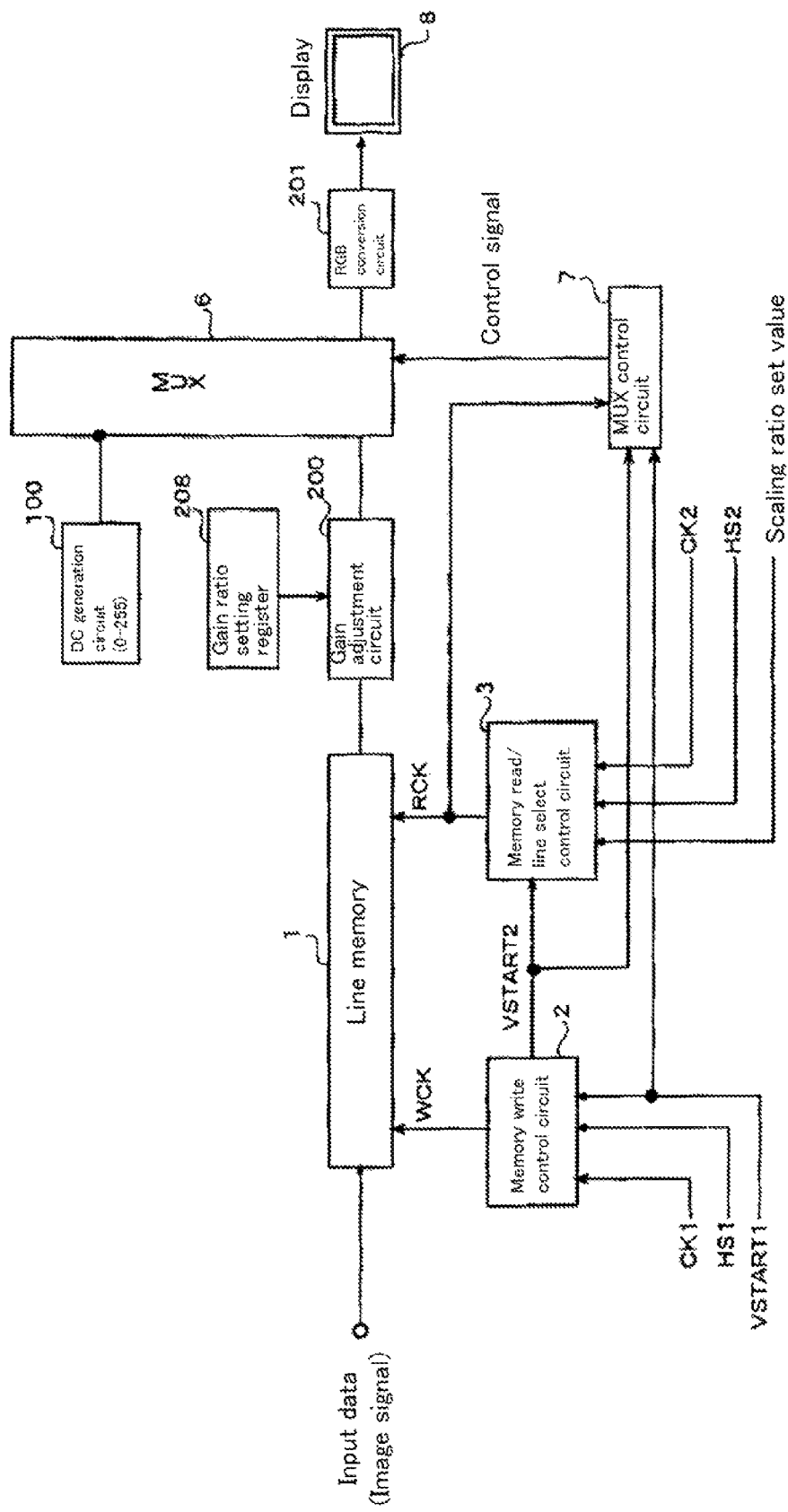

In the illustrated embodiment shown in FIG. 10, a gain adjustment circuit 200 is put at the rear stage of the line memory 1. In order to increase the brightness level depending on the gain ratio set in the gain ratio setting register 208, the numeric value of the Y component is further increased. As the Y component raises, the color brightness level increases. A line with an image can be increased in brightness level with the gain adjustment circuit 200. Upon receipt of a GND level value from the DC generation circuit 100, a black image signal is inputted into the blank line. Thus, the line with an image will increase in brightness level, and the blank line will decrease in brightness level. As a result the entire image displayed on the display 8 has an appropriate brightness.

Some displays 8 of certain types do not accept an output signal in the YCbCr format. In such cases, it is required to convert the output YCbCr format signal into a RGB format signal with a RGB conversion circuit 201. If no RGB conversion is required, the YCbCr format image data will be outputted as it is.

The Y component of the YCbCr format signal can be simply increased by a certain amount of value. In such a case, however, such adjustment processing of simply adding the same value may sometimes result in exceeding of a color representable range because color brightness components and chroma components are distinguished in the YCbCr format color space and the distribution of the chroma components is not constant depending on each brightness. In other words, in a YCbCr color space, each color component does not exist independently, but exists in a manner such that each color component has any relationship with the other color components. Therefore, the color adjustment may cause a drawback that the adjusted color is quite different from the actual color. Accordingly, in cases where an original image signal is a RGB format signal, in converting a RGB format into a YCbCr format, it is preferable to perform the conversion by using specific coefficients α1, α2 and α3 as follows:

$$YD1=(Y*\alpha1)+(Cb*\alpha2)+(Cr*\alpha3) \quad \text{Formula (4)}$$

where YD1: brightness level of insertion pixel, α1, α2 and α3: specific coefficient; Y: brightness level of original pixel; Cb: brightness level of original pixel; and Cr: brightness level of original pixel.

Human eyes can sensitively recognize skin colors. It is considered that this ability is naturally obtained by human behaviors of judging human's physical conditions from slight difference in skin color of a human's face. Thus, human is also sensitive to the skin color of an image displayed on a display. Accordingly, inappropriate conversion of a skin color causes a hard-to-see image. Therefore, in deciding the brightness component, it is preferable to perform color correction as shown in the following equation to obtain a natural skin color. In converting a RGB format into a YCbCr format, it is preferable to perform the conversion using Formula (4) and Formula (5).

$$YD2=[(Y*\alpha1)+(Cb*\alpha2)+(Cr*\alpha3)]/(127-Cb) \quad \text{Formula (5)}$$

where YD2: brightness level of insertion pixel, α1, α2 and α3: specific coefficient; Y: brightness level of original pixel; Cb: brightness level of original pixel; and Cr: brightness level of original pixel.

Figure 11:
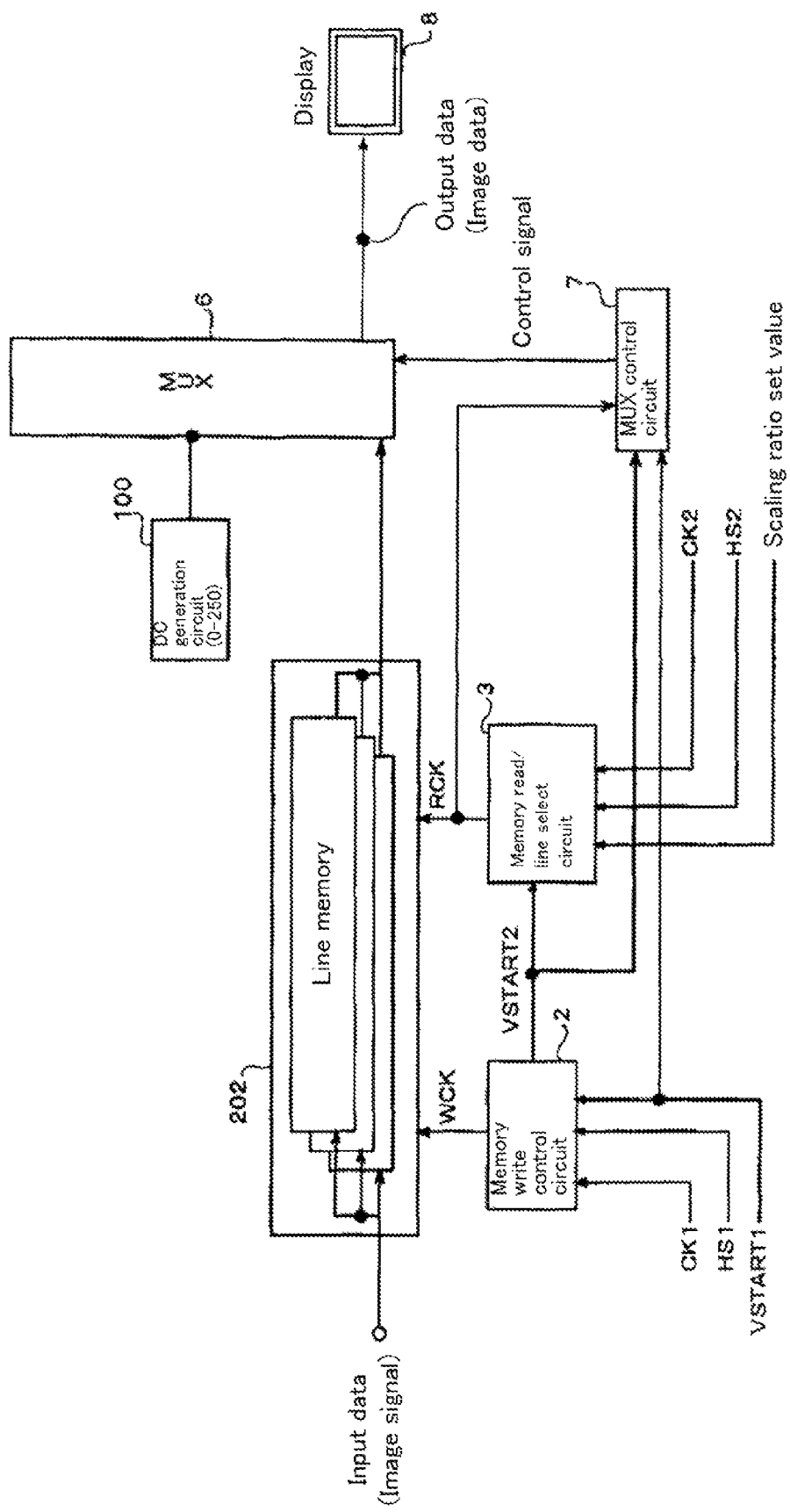

In the aforementioned IP conversions, the number of scanning lines in the vertical direction is not basically increased. A scale function can be easily provided by adding a plurality of line memories. For example, as shown in FIG. 11, by employing a line memory 202 having three-staged line memories therein, the vertical scaling can be increased. In this embodiment, the input image signal data which is digital image signal data is inputted into any one of the three line memories. The image signal data to be inputted is connected all of the three line memories and written in any one of write enabled line memories. At this time, although a new image signal data is written in one line memory previously written image signal data is held by the other two line memories. By outputting the same image data previously outputted to the display and stored in the line memory holding the previous image data, it becomes possible to double the scaling in the vertical direction. As to the horizontal direction, by increasing the clock frequency of the reading clock signal RCK with respect to the that of the writing clock signal WCK and reading the data two times or three times by the reading clock signal RCK, it becomes possible to double or triple the scaling in the horizontal direction. Thus, the horizontal scaling can be easily changed by simply increasing the clock frequency of the reading clock RCK without providing a plurality of line memories in order to adjust the horizontal resolution of the display 8 to which the image data is outputted, the coefficient generation portion 7 generates a coefficient defining how many times the same data is to be outputted. In the case of a normal IP conversion in which no screen size is changed, since the horizontal direction is not enlarged, the coefficient of "1.00" is outputted. In the case of converting a normal size TV of 4:3 into a wide size of 16:9, 4:3 equals to 12:9 (4:3=12:9) and therefore the horizontal size is enlarged from 12 to 16 with respect to the vertical size. The coefficient of this case will be "1.33" obtained by dividing 16 by 12. The scaling is not always required to be an integral multiplication. In some displays, the scaling does not become an integral multiplication of an interlace signal. In the case of converting from a normal size 4:3 into a wide size 16:9, the horizontal scaling can be performed by reading the same data once among three times and outputting data two times among three times as it is.

As explained above, by using a plurality of line memories and employing anomalistic processing of the reading clock signal RCK, it becomes possible to cope with any scaling both in the vertical direction and the horizontal direction.

Figure 12:
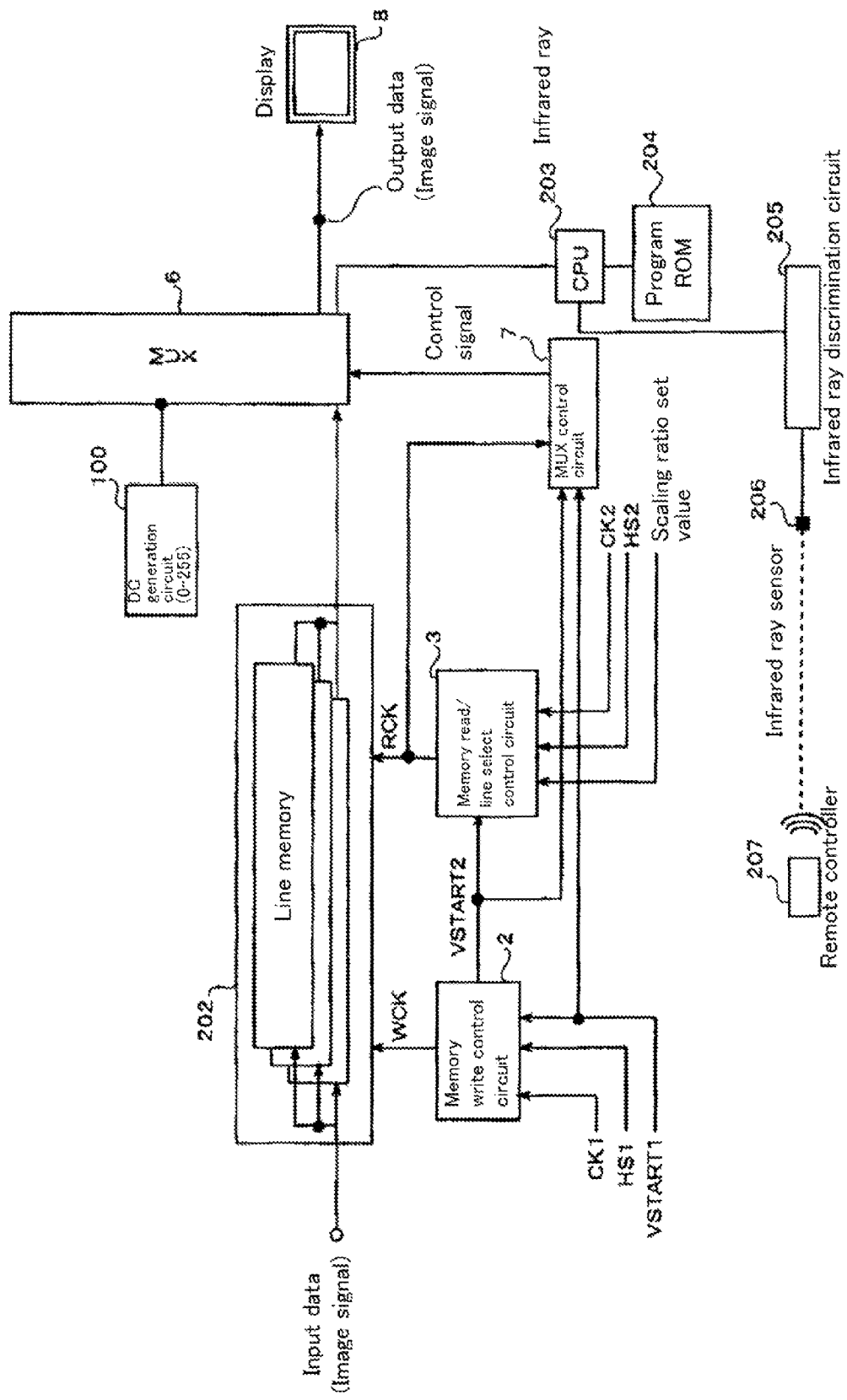
Figure 13:
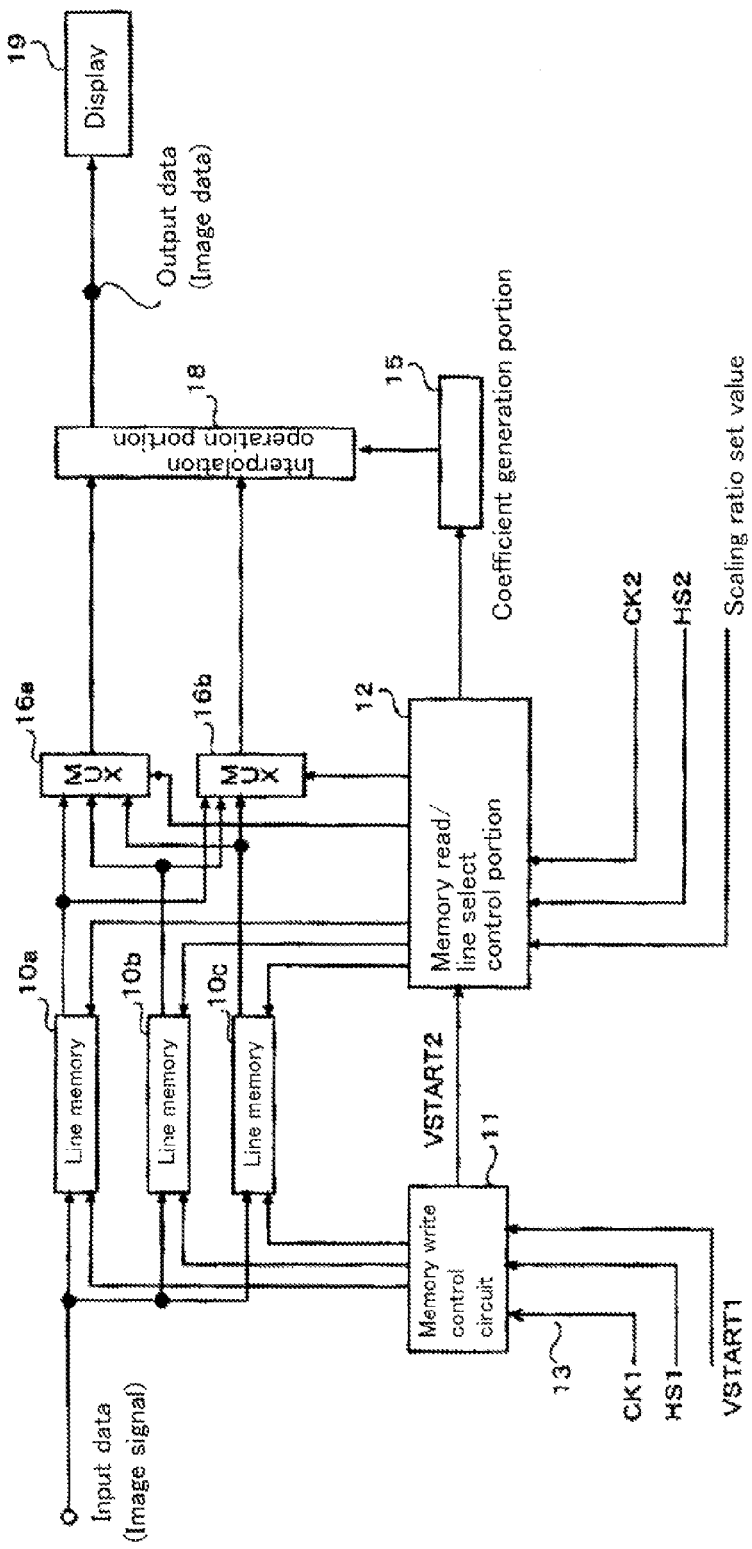
FIG. 13 is a block diagram showing an image signal processing circuit as a related art.

FIG. 12 illustrates an image signal processing circuit in which scaling technique is employed. In FIG. 12, the multiplexer 6 is connected to the CPU 203. Depending on the setting of the CPU 203, the multiplexer 6 can arbitrarily change the setting. This realizes an easy-to-see display and enhances the usability. Depending on the brightness of the screen of the display 8, a user can change the setting using a remote controller 207. The setting by the user is outputted as an infrared ray from the remote controller 207 and received by an infrared ray sensor 206. The received signal is discriminated by the infrared ray discrimination circuit 205. The discrimination signal is inputted into the CPU 203. The CPU 203 is operated based on the program stored in a program ROM 204. It can be configured such that the adjustment and/or method of the brightness level is changed depending on the signal discriminated by the infrared ray discrimination circuit 205 and the program stored in the program RON 204 on a case-by-case basis.

As will be apparent from the above-explanation, according to the aforementioned preferable embodiments of the present invention, no filtering processing is performed at the time of converting an interlace image signal into a progressive image signal, which does not cause deterioration of the sharpness of the converted image. Even in the case of an image quick in motion, the line signal with a movement changes every frame cycle. Therefore, even in the case of an LCD panel not so fast in operation property, it is possible to provide an image less invisible in motion blurring.

Furthermore, according to the aforementioned preferable embodiments of the present invention, at the time of converting an interlace image signal into a progressive image signal, the number of line memories can be reduced as compared with a conventional image signal processing circuit which required a plurality of line memories, resulting in a reduced circuit size and reduced cost.

Furthermore, according to the aforementioned preferable embodiments of the present invention, at the time of converting an interlace image signal into a progressive image signal, a brightness level appropriate to a screen to be used can be attained. Such an appropriate brightness makes it possible to provide an easy-to-see display.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably but not limit to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image signal processing apparatus for converting an interlace signal which creates a frame image by alternately displaying an odd field and an even field on a single screen into a progressive signal, the apparatus comprising:
- a line memory for storing the interlace signal;
- a writing/reading portion for writing/reading the interlace signal into/from the line memory;
- a first signal generation portion for generating a first prescribed signal;
- a second signal generation portion for generating a second prescribed signal;
- a selector for selectively outputting the interlace signal from the line memory, the first prescribed signal from the first signal generation portion, or the second prescribed signal from the second signal generation portion; and
- a controller for controlling signal selection by the selector,
- wherein the controller controls the selector such that, when the odd field of the interlace signal is being read from the line memory, the interlace signal is outputted from the line memory to odd lines of a progressive signal to be converted and the first prescribed signal from the first signal generation portion and the second prescribed signal from the second generation portion are outputted to even lines of the progressive signal alternatively every pixel, and when the even field of the interlace signal is being read from the line memory, the interlace signal is outputted from the line memory to even lines of the progressive signal and the first prescribed signal and the second prescribed signal are outputted to odd lines of the progressive signal alternatively every pixel.

2. The image signal processing apparatus as recited in claim 1,
- wherein the first signal generation portion generates a black image signal showing black or color close to black as the prescribed signal, and
- wherein the second signal generation portion generates a white image signal showing white or color close to white as the prescribed signal.

3. The image signal processing apparatus as recited in claim 1,
- wherein one of the first and second signal generation portions generates an intermediate color signal showing color between white and black as the prescribed signal.

4. The image signal processing apparatus as recited in claim 1,
- wherein one of the first and second signal generation portions generates a color signal showing color other than white, black and an intermediate color between white and black as the prescribed signal.

5. An image signal processing apparatus for converting an interlace signal which creates a frame image by alternately displaying an odd field and an even field on a single screen into a progressive signal, the apparatus comprising:
- a line memory for storing the interlace signal;
- a writing/reading portion for writing/reading the interlace signal into/from the line memory;
- a first signal generation portion for generating a first prescribed signal;
- a second signal generation portion for generating a second prescribed signal;
- a selector for selectively outputting the interlace signal from the line memory, the first prescribed signal from the first signal generation portion, or the second signal prescribed signal from the second signal generation portion; and
- a controller for controlling signal selection by the selector,
- wherein the controller controls the selector such that, when the odd field of the interlace signal is being read from the line memory, the interlace signal is outputted from the line memory to odd lines of a progressive signal to be converted and the first prescribed signal from the first signal generation portion and the second prescribed signal from the second generation portion are alternately outputted to a single horizontal even line and a single horizontal odd line of the progressive signal, and when the even field of the interlace signal is being read from the line memory, the interlace signal is outputted from the line memory to even lines of the progressive signal and the first prescribed signal and the second prescribed signal are alternately outputted to a single horizontal even line and a single horizontal odd line of the progressive signal.

6. The image signal processing apparatus as recited in claim 5,
- wherein the first signal generation portion generates a black image signal showing black or color close to black as the prescribed signal, and
- wherein the second signal generation portion generates a white image signal showing white or color close to white as the prescribed signal.

7. The image signal processing apparatus as recited in claim 5,
- wherein one of the first and second signal generation portions generates an intermediate color signal showing color between white and black as the prescribed signal.

8. The image signal processing apparatus as recited in claim 5,
- wherein one of the first and second signal generation portions generates a color signal showing color other than white, black and an intermediate color between white and black as the prescribed signal.

* * * * *